UNITED STATES PATENT OFFICE.

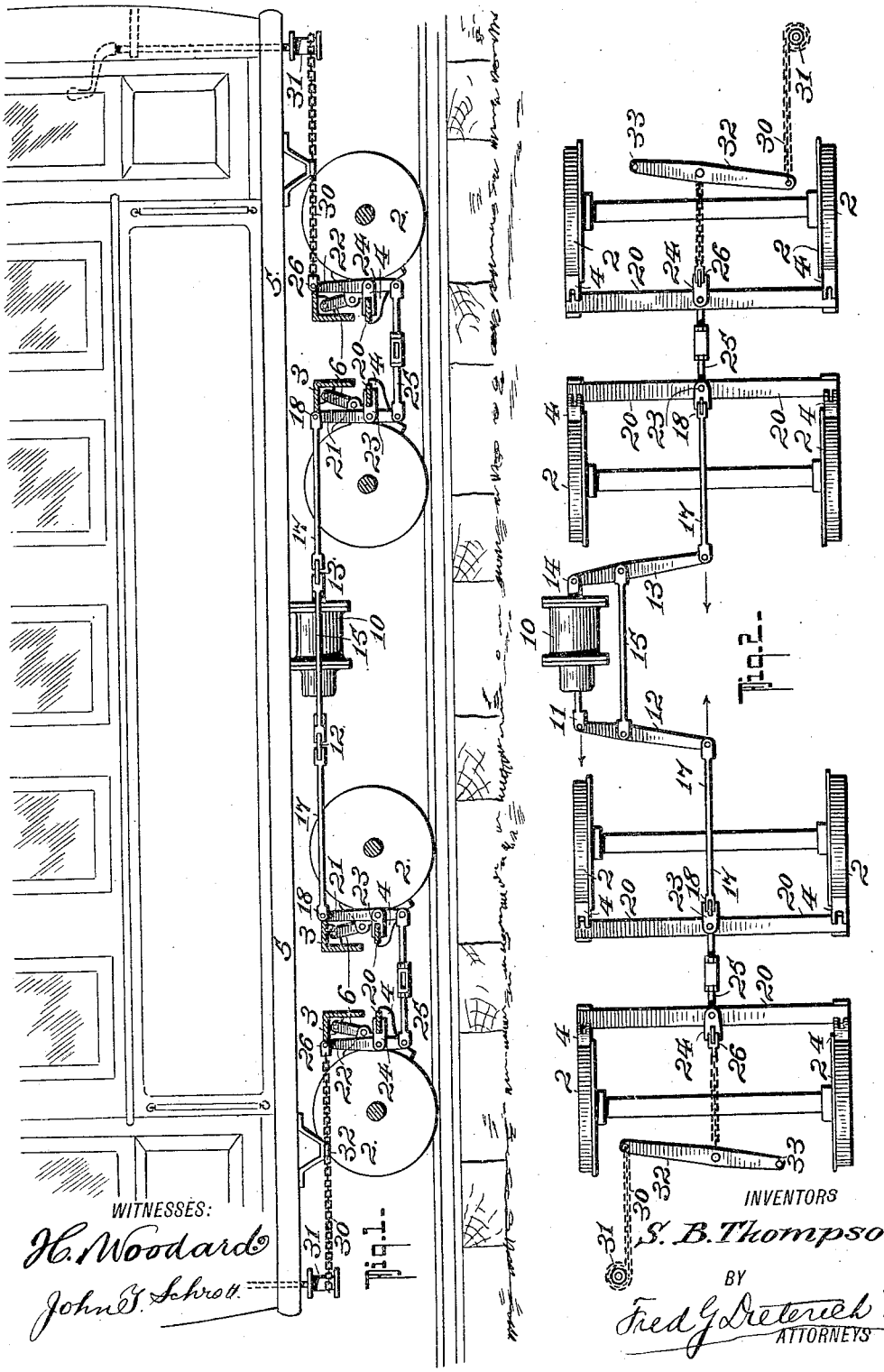

SAMUEL B. THOMPSON, OF VANCOUVER, BRITISH COLUMBIA, CANADA.

STREET-CAR BRAKE.

1,121,952.  Specification of Letters Patent.  Patented Dec. 22, 1914.

Application filed April 23, 1912. Serial No. 692,636.

*To all whom it may concern:*

Be it known that I, SAMUEL B. THOMPSON, citizen of the United States of America, residing at Vancouver, in the Province of British Columbia, Canada, have invented a new and useful Street-Car Brake, of which the following is a specification.

This invention relates to an improvement in the application of a hand brake to the power brake lever system of a street car.

The common practice at present is to connect the hand brake from either end of the car to the lever system of the power brake adjacent to where the power is applied, so that if any part of that lever system breaks or a pin is lost, the brake blocks cannot be applied to the wheels by hand, and a means which is intended for an emergency is useless when the emergency arises. This objection I overcome by applying the hand brake from each end of the car to the lever system of the truck of that end or to what is now the final fixed fulcrum at each end of the lever system; so that in the event of an accident happening to any part of the mechanism between the point of application of the power and the brake levers of the truck, the hand brake may be applied to the wheels of each truck from the end of the car adjacent.

The invention is particularly described in the following specification, reference being made to the drawings by which it is accompanied, in which:

Figure 1 is a vertical longitudinal section illustrating the lever system by which an air brake cylinder is connected to the brake shoes of the two trucks of a car showing my method of connecting the hand brakes thereto. Fig. 2 is a plan of the same with the truck frame removed.

In these drawings 2 represents the wheels of the trucks at each end of the car, 3 being a portion of the truck frame, 4 the brake shoes and 5 the underside of the car body. The brake shoes 4 are suspended by links 6 from the frame 3 of each truck so as to apply to the adjacent sides of each pair of wheels. Where the construction of the car truck will allow, these brake blocks are applied to the wheels by brake beams 20 which extend between the blocks of each pair of wheels and are connected in the middle line of the car at 23 and 24 to a lever 21 or 22, the lower ends of which are connected together by a rod 25. To the upper end 18 of the innermost lever 21 the pull rod 17 is connected from the power brake; and to the corresponding end 26 of the outermost lever 22 is connected at 26 a pull rod or chain from the hand brake at that end of the car.

The cross head pin 11 of the power cylinder 10 is connected to the pull rod 17 of one end of the car by a lever 12 and a similar lever 13 connects the pull rod of the other end to a fixed fulcrum 14 on the back cover of the cylinder. These levers 12 and 13 are connected together by a tie rod 15, so that as the piston of the power cylinder 10 is moved out a pull will be imparted to each rod 17 and the brake shoes will be applied to the wheels of both trucks. The force of the pull chain 30 from the hand brake 31 is multiplied by applying it to the end of a lever 32, which is fulcrumed to the car body at 33, and by connecting the pin 26 of the brake beam lever 22 to a position between the fulcrum 33 and the connection of the hand brake 30. With this arrangement of connections, when the power brake is applied it acts in the same manner as at present, the connection 26 of the hand brake to the upper end of the lever 22 acting as the fixed fulcrum of the system on each truck. When the hand brake of either end of the car is applied, the pull is communicated through this connection 26 and the connection 18 of each pull rod 17 to its lever 21 becomes the fixed fulcrum for each truck brake.

To insure that the hand brake connections through the pins 26 shall not be overstrained while acting as the fixed fulcrum during the power brake application; and that the hand brake application from either end of the car shall act only on the brakes of the truck at the corresponding end of the car, care should be taken that the upper ends of the levers 22 in the one case and of 21 in the other are checked against movement inward toward one another. This may be effectively done by arranging the upper end of each to contact against the frame 3 of the truck, preferably adjacent to the pins 18 and 26. Thus, in the event of anything going wrong with the power brake mechanism, the hand brake may be applied to one or the other trucks by the motorman or conductor and a very high factor of safety is provided against accident. The provision of this security adds nothing to the cost of the brake as the hand brake mechanism is merely applied to such part of the existing mechanism where its use will not be impaired by failure of the power brake system to which no material change is required.

Although the arrangement of levers has been described as applicable to a system wherein the pressure is applied to the shoes through brake beams extending between them, it is equally applicable to that system wherein, owing to want of room for the brake beams, each brake shoe is provided with a lever 21 or 22 connected by a rod 25 on each side, and the pull of the rod 17 from the power brake is applied to their upper ends through what is termed a radial bar extending between them. In such case the only change required is that a radial bar is provided for the upper ends of the levers 22 as well as for 21, to enable the handle brake connection to be made to the two levers 22 of each truck, and that means is provided for the upper ends of 22 and 21 to prevent either one of them moving inward toward the other while allowing the upper end of 21 to move in response to the pull of the power brake, and of 22 in response to the pull of the hand brake.

The application of the hand brake and the provision of the checks in the manner described form the essential features of the invention.

Having now particularly described my invention and the manner of its use, I hereby declare that what I claim as new and desire to be protected in by Letters Patent, is:

1. A car brake for high speed electric railway cars provided with a pair of trucks each having two sets of wheels, comprising depending brake levers mounted on each truck between adjacent sets of wheels, brake beams connected to said levers intermediate their ends, brake shoes connected to said brake beams to coöperate with the adjacent wheels, between which they are located, an adjustable equalizing bar connected to said brake levers adjacent their lower ends, a power applying device comprising an air cylinder, power transmitting connections between said power applying device and one of said brake applying levers of each truck adjacent the upper end of said lever, hand applying devices comprising a brake shaft adjacent each end of the car and connected hand applying connections each comprising a multiplying lever connected to the other brake lever on each of said trucks to enable each of the hand applying devices to strongly apply the brakes of the adjacent truck independently of the power transmitting connections.

2. A car brake for railway cars provided with a pair of trucks each having two sets of wheels, comprising brake levers mounted on each truck between adjacent sets of wheels, brake beams connected to said levers intermediate their ends, brake shoes connected to said brake beams to coöperate with the adjacent wheels between which they are located, an equalizing bar connected to said brake levers, a power applying device, power transmitting connections between said power applying device and one of said brake applying levers of each truck, hand applying devices adjacent each end of the car and connected hand applying connections connected to the other brake lever on each of said trucks to enable each of the hand applying devices to apply the brakes of the adjacent truck independently of the power transmitting connections.

In testimony whereof I have signed my name to this specification in the presence of two subscribing witnesses.

SAMUEL B. THOMPSON.

Witnesses:
ROWLAND BRITTAIN,
MAY WHITE.

Copies of this patent may be obtained for five cents each, by addressing the "Commissioner of Patents, Washington, D. C."